United States Patent
Mallon

(10) Patent No.: US 8,920,554 B2
(45) Date of Patent: Dec. 30, 2014

(54) METHOD FOR PREPARING VERY LOW VISCOSITY CELLULOSE ETHER AND PRODUCT

(75) Inventor: Charles B. Mallon, Hillsborough, NJ (US)

(73) Assignee: Dow Global Technologies LLC, Midland, MI (US)

( * ) Notice: Subject to any disclaimer, the term of this patent is extended or adjusted under 35 U.S.C. 154(b) by 312 days.

(21) Appl. No.: 12/741,771

(22) PCT Filed: Nov. 5, 2008

(86) PCT No.: PCT/US2008/082477
§ 371 (c)(1),
(2), (4) Date: Aug. 17, 2010

(87) PCT Pub. No.: WO2009/061815
PCT Pub. Date: May 14, 2009

(65) Prior Publication Data
US 2010/0307379 A1    Dec. 9, 2010

Related U.S. Application Data

(60) Provisional application No. 60/986,686, filed on Nov. 9, 2007.

(51) Int. Cl.
| C07G 17/00 | (2006.01) |
| C08B 11/20 | (2006.01) |
| C08L 1/26 | (2006.01) |
| C09D 101/26 | (2006.01) |

(52) U.S. Cl.
CPC . *C08B 11/20* (2013.01); *C08L 1/26* (2013.01); *C09D 101/26* (2013.01)
USPC ........... 106/172.1; 536/124; 536/56; 106/172

(58) Field of Classification Search
None
See application file for complete search history.

(56) References Cited

U.S. PATENT DOCUMENTS

| 3,060,139 A | 10/1962 | Greminger, Jr. et al. |
| 4,302,440 A | 11/1981 | John et al. |
| 4,988,807 A | 1/1991 | Christensen et al. |
| 5,019,398 A | 5/1991 | Daste |
| 5,218,107 A | 6/1993 | Schulz |
| 6,939,961 B1 * | 9/2005 | Schlesiger .................... 536/124 |
| 2002/0168407 A1 * | 11/2002 | Koch et al. .................... 424/480 |
| 2004/0242862 A1 * | 12/2004 | Hammes ....................... 536/120 |

FOREIGN PATENT DOCUMENTS

| EP | 1423433 | 6/2004 |
| WO | 01/18062 | 3/2001 |
| WO | 2007145709 A1 | 12/2007 |

* cited by examiner

*Primary Examiner* — Melvin C Mayes
*Assistant Examiner* — Colette Nguyen

(57) ABSTRACT

The present disclosure is directed to methods for producing a very low viscosity cellulose ether having little or no discoloration and cellulose ether products resulting therefrom. The method includes contacting a cellulose ether with an oxidizing agent and an acid to form a mixture. The mixture is then heated and neutralized. The method includes adding a second oxidizing agent to the mixture and forming a very low viscosity cellulose ether having a viscosity from 1.2 cP to less than 2 cP. The very low viscosity ether may also have an APHA color value of 1 to 100.

10 Claims, 1 Drawing Sheet

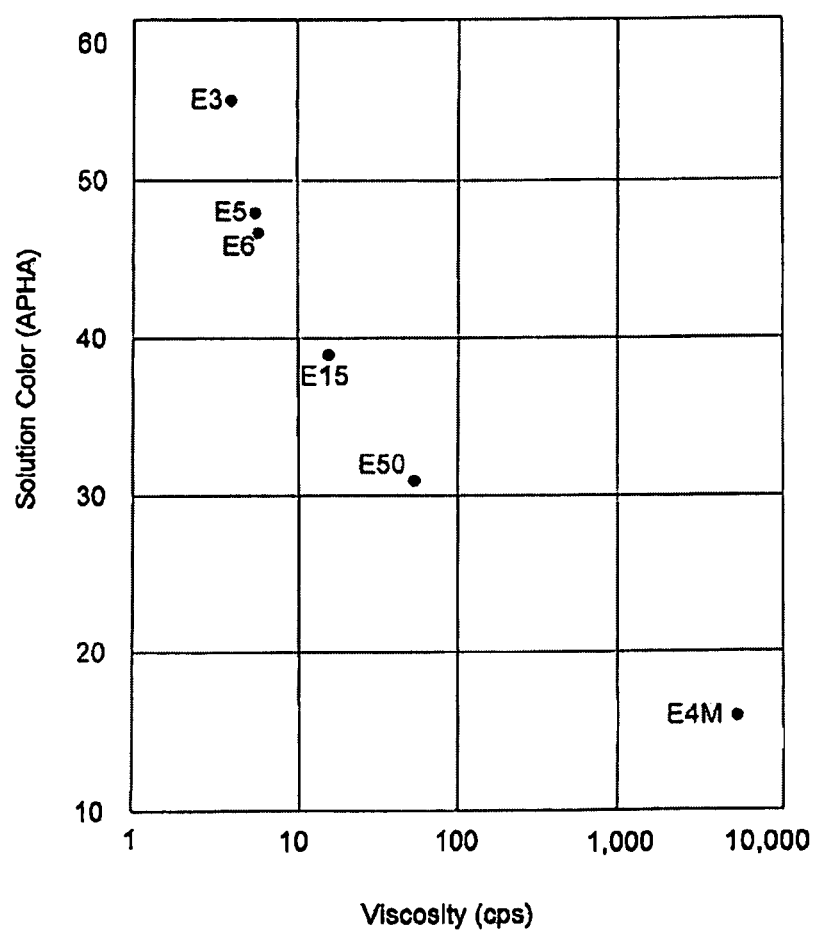

US 8,920,554 B2

METHOD FOR PREPARING VERY LOW VISCOSITY CELLULOSE ETHER AND PRODUCT

CROSS REFERENCE TO RELATED APPLICATIONS

This application is a 35 USC §371 national phase filing of PCT/US2008/082477, filed Nov. 5, 2008, which claims the benefit of U.S. Provisional Application No. 60/986,686, filed Nov. 9, 2007.

BACKGROUND

The present disclosure relates to methods for forming very low viscosity cellulose ethers and cellulose ether products resulting therefrom.

Cellulose ethers are commonly used as a film coating material on tablets, as a food additive, and in pharmaceutical capsules. Low molecular weight cellulose ethers oftentimes exhibit yellowing or discoloration. It is known that as the molecular weight of the cellulose ether decreases, the degree of discoloration increases.

It would be desirable to develop a very low viscosity cellulose ether with a color that is acceptable for appearance-sensitive applications.

SUMMARY

The present disclosure is directed to methods for producing a very low viscosity cellulose ether having little or no discoloration and products of the same. In an embodiment, a method for producing a cellulose ether is provided. The method includes contacting a cellulose ether with an oxidizing agent and an acid to form a mixture. The mixture is then heated. The mixture is subsequently neutralized. The method includes adding at least a second oxidizing agent to the mixture and forming a cellulose ether having a viscosity from 1.2 cP to 50 cP when measured at 20° C. In an embodiment, the method forms a very low viscosity cellulose ether having a viscosity from 1.2 cP to less than 2 cP measured at 2% by weight aqueous solution at 20° C.

The mixture may be heated at a temperature from 70° C. to 100° C. for 1 to 20 hours. The mixture may also be heated after addition of the second oxidizing agent under the same parameters.

In an embodiment, the method includes maintaining the water content of the mixture between 3% and 6% by weight.

In an embodiment, the method may be performed in an oxygen-free environment. The oxygen-free environment may be provided by applying an inert gas blanket to the reaction chamber.

In an embodiment, the method includes forming a cellulose ether having an APHA value from 1 to 100. In another embodiment the method may include forming the cellulose ether to have an APHA value from 1 to 20. Thus, the very low viscosity cellulose ether may simultaneously be a very low color cellulose ether.

Another method for producing a cellulose ether is provided. In an embodiment, this method for cellulose ether production includes contacting a cellulose ether with a first oxidizing agent to form a mixture. The mixture is heated. The method also includes adding a second oxidizing agent to the mixture, and forming a very low color cellulose ether having an APHA value from 1 to 20. This method produces a very low color cellulose ether without the addition of an acid. The heating may occur before the addition of the second oxidizing agent, after the addition of the second oxidizing agent, and combinations thereof.

In an embodiment, the method includes contacting the cellulose ether with an acid. The acid is added along with the first oxidizing agent, and forms a cellulose ether having a viscosity less than about 3 cP measured at 2% by weight aqueous solution at 20° C. The mixture may be neutralized after the heating.

In an embodiment, a method for coating a substrate is provided. The method includes applying an aqueous solution of a very low viscosity cellulose ether on the substrate, and forming a coating containing the very low viscosity ether on the substrate. The aqueous solution may have an API-IA value from 1 to 100. In another embodiment, the coating may be applied on the entire substrate so that the coating surrounds the entire substrate.

In an embodiment, the aqueous solution contains at least 10% by weight of the very low viscosity cellulose ether. This high concentration cellulose ether solution is then sprayed onto the substrate to coat the substrate.

In an embodiment, a composition is provided. The composition may be a coating composition. The composition includes a cellulose ether. A 2% by weight aqueous solution of the cellulose ether has a viscosity from 1.2 cP to less than 2 cP at 20° C. The 2% by weight aqueous solution of the cellulose ether may also have an APHA value from 1 to 100. In an embodiment, the cellulose ether is hydroxypropylmethylcellulose. The composition may be a coating solution. The coating solution may contain at least 10% by weight of the cellulose ether.

In an embodiment, another composition, which may be a coating composition, is provided. The composition includes a cellulose ether. A 2% by weight aqueous solution of the cellulose ether has a viscosity less than 3 cP at 20° C. and an APHA value from 1 to 100.

In an embodiment, a coated composition is provided. The coated composition includes a substrate and a coating on the substrate. The coating contains a very low viscosity cellulose ether. The cellulose ether present in the coating has a viscosity from 1.2 cP to less than 2 cP measured at 2% by weight aqueous solution at 20° C. The coating may surround the entire substrate.

In a further embodiment, the coating contains at least 10% by weight of the very low viscosity cellulose ether. The coating may be a single layer. The coating may be present in an amount from 1% to 20% by weight of the substrate.

In an embodiment, the very low viscosity cellulose ether present in the coating is a very low color cellulose ether. In an embodiment, the coating may be transparent, clear, haze-free and/or color-free.

An advantage of the present disclosure is the provision of an improved method for making very low viscosity cellulose ether.

An advantage of the present disclosure is the provision of an improved method for making a very low color cellulose ether.

An advantage of the present disclosure is the provision of an improved very low viscosity cellulose ether.

An advantage of the present disclosure is the provision of a very low viscosity cellulose ether that is also a very low color cellulose ether.

BRIEF DESCRIPTION OF THE DRAWING

FIG. 1 is a color vs. viscosity graph for conventional cellulose ethers.

DETAILED DESCRIPTION

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, molecular weights and other properties.

The term "composition," as used herein, includes a mixture of materials which comprise the composition, as well as reaction products and decomposition products formed from the materials of the composition.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron microscopy.

In an embodiment, a method for producing a cellulose ether is provided. The method includes contacting a cellulose ether with a first oxidizing agent to form a mixture. An acid is added to the mixture. The mixture is heated to depolymerize the cellulose ether. The mixture is subsequently neutralized. The method includes adding at least a second oxidizing agent to the mixture. The method further includes forming a cellulose ether having a viscosity from 1.2 cP to 50 cP (or any value or subrange therebetween) when measured at 2% by weight aqueous solution at 20° C.

In an embodiment, the method includes forming a very low viscosity cellulose ether. As used herein, a "very low viscosity" (VLV) cellulose ether is a cellulose ether having a molecular weight such that a 2% by weight aqueous solution of it at 20° C. has a viscosity of from 1.2 centipoise (cP) to less than 2 cP (or any value or subrange therebetween). It is understood that the viscosity values set forth herein are determined according to ASTM D1347 (methyl cellulose) and/or ASTM D2363 (hydroxypropylmethylcellulose) as measured in 2% by weight cellulose ether aqueous solution at 20° C.

As used herein, a "cellulose ether" is an ether-linked derivative, either partial or complete, of cellulose. Cellulose ether is produced from cellulose pulp, typically obtained from wood or cotton. The cellulose pulp is converted into alkali cellulose by alkalizing the cellulose pulp with an alkaline hydroxide, and then etherifying the alkalized cellulose in a dry, gas-phase or slurry process with one or more etherifying agents to form a high molecular weight cellulose ether. The molecular weight of these cellulose ethers can then be reduced by depolymerizing the cellulose ether with an acid, such as hydrogen chloride, and optionally neutralizing the depolymerized cellulose ether with a basic compound, such as anhydrous sodium bicarbonate. Alternatively, the cellulose ether may be further depolymerized by way of acid catalyzed degradation, oxidative degradation, degradation by high-energy radiation, and degradation by way of microorganisms or enzymes.

The cellulose ether may be a "water soluble" cellulose ether or a "water insoluble" cellulose ether. A "water-soluble" cellulose ether is a cellulose ether that prior to the partial depolymerization has a solubility in water of at least 2 grams in 100 grams of distilled water at 25° C. and 1 atmosphere. Nonlimiting examples of water soluble cellulose ethers include carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, mixed $C_1$-$C_3$-alkyl celluloses, such as methyl ethyl celluloses, or alkoxy hydroxyethyl hydroxypropyl celluloses, the alkoxy group being straight-chain or branched and containing 2 to 8 carbon atoms.

The cellulose ether may be a water-insoluble cellulose ether. A "water-insoluble" cellulose ether is a cellulose ether that prior to the partial depolymerization has a solubility in water of less than 2 grams, or less than 1 gram in 100 grams of distilled water at 25° C. and 1 atmosphere. Nonlimiting examples of water-insoluble cellulose ether include ethylcellulose, propylcellulose and butylcellulose.

In an embodiment, the cellulose ether is methylcellulose, hydroxyethyl cellulose, hydroxypropyl cellulose, hydroxyethylmethyl cellulose, hydroxypropylmethyl cellulose, hydroxybutylmethyl cellulose, ethylhydroxyethyl cellulose, carboxymethyl cellulose, and carboxymethyl hydroxyethylcellulose.

In a further embodiment, the cellulose ether is a hydroxypropylmethylcellulose (HPMC) or a methycellulose (MC). HPMC and MC are available under the METHOCEL trademark from The Dow Chemical Company, Midland, Mich. Nonlimiting examples of suitable HPMC and MC are set forth in Table 1 below.

TABLE 1

METHOCEL ™ Products

| METHOCEL ™ Product | Chemical Type | Methoxyl Content, % | Hydroxypropyl Content, % | Viscosity of 2% solution in water, cps |
|---|---|---|---|---|
| METHOCEL ™ A15 Premium LV | Methylcellulose, USP | 27.5-31.5 | 0 | 12-18 |

TABLE 1-continued

METHOCEL ™ Products

| METHOCEL ™ Product | Chemical Type | Methoxyl Content, % | Hydroxypropyl Content, % | Viscosity of 2% solution in water, cps |
|---|---|---|---|---|
| METHOCEL ™ A4C Premium | Methylcellulose, USP | | | 300-560 |
| METHOCEL ™ A15C Premium | Methylcellulose, USP | | | 1125-2100 |
| METHOCEL ™ A4M Premium | Methylcellulose, USP | | | 3000-5600 |
| METHOCEL ™ E3 Premium LV | Hypromellose 2910 | 28-30 | 7-12 | 2.4-3.6 |
| METHOCEL ™ E5 Premium LV | Hypromellose 2910 | 28-30 | 7-12 | 4-6 |
| METHOCEL ™ E6 Premium LV | Hypromellose 2910 | 28-30 | 7-12 | 5-7 |
| METHOCEL ™ E15 Premium LV | Hypromellose 2910 | 28-30 | 7-12 | 12-18 |
| METHOCEL ™ E50 Premium LV | Hypromellose 2910 | 28-30 | 7-12 | 40-60 |
| METHOCEL ™ E4M Premium | Hypromellose 2910 | 28-30 | 7-12 | 3000-5600 |
| METHOCEL ™ E10M Premium CR | Hypromellose 2910 | 28-30 | 7-12 | 7500-14,000 |
| METHOCEL ™ F50 Premium | Hypromellose 2906 | 27-30 | 4-7.5 | 40-60 |
| METHOCEL ™ F4M Premium | Hypromellose 2906 | 27-30 | 4-7.5 | 3000-5600 |
| METHOCEL ™ K3 Premium LV | Hypromellose 2208 | 19-24 | 7-12 | 2.4-3.6 |
| METHOCEL ™ K100 Premium LV | Hypromellose 2208 | 19-24 | 7-12 | 80-120 |
| METHOCEL ™ K4M Premium | Hypromellose 2208 | 19-24 | 7-12 | 3,000-5,600 |
| METHOCEL ™ K15M Premium | Hypromellose 2208 | 19-24 | 7-12 | 11,250-21,000 |
| METHOCEL ™ K100M Premium | Hypromellose 2208 | 19-24 | 7-12 | 80,000-120,000 |

In an embodiment, the cellulose ether utilized in the mixture is a high viscosity cellulose ether. A "high viscosity" cellulose ether is a cellulose ether having a molecular weight such that a 2% by weight aqueous solution of it at 20° C. has a viscosity greater than 400 cP, or from 400 cP to 100,000 cP. In another embodiment, the initial cellulose ether may be a low viscosity cellulose ether. A "low viscosity" cellulose ether is a cellulose ether having a molecular weight such that a 2% by weight aqueous solution of it at 20° C. has a viscosity of 2 centipoise (cP) to 400 cP. In a further embodiment, the initial cellulose ether has a viscosity greater than the viscosity of the cellulose ether after completion of the method.

In an embodiment, the cellulose ether is a free-flowing particulate material. The cellulose ether is ground and dried. The average particle size for the cellulose ether may be from 20 μm to about 1000 μm (or any value or subrange therebetween). The moisture content for the initial cellulose ether is from 1% by weight to 10% by weight (or any value or subrange therebetween), or from 1.5% by weight to 5% by weight, or about 2% by weight of the cellulose ether.

The cellulose ether is placed in a chamber of a reactor. The reactor may be equipped to agitate, mix, or stir the materials placed therein. Nonlimiting examples of suitable reactors include a flask, an egg-shaped flask, a tumbling reactor, a ribbon blender, a Loedige reactor, and a rotary evaporator. Any of the foregoing reactors may be equipped with a suitable equipment to mix, agitate, and/or stir the contents of the reactor.

The oxidizing agent is added to the cellulose ether in the reactor to form the mixture. The oxidizing agent may be hydrogen peroxide and salts thereof, other peroxo compounds such as, for example, sodium peroxosulfate, ozone, perborates sodium chlorite, halogens, halogen oxides and other compounds used for bleaching. In an embodiment, the oxidizing agent is hydrogen peroxide. The oxidizing agent may be added in solution form. The concentration of oxidizing agent may range from 1% to 50% or from 30% to 40% by weight of the solution. The oxidizing agent may be added in an amount from about 0.01% to about 6% by weight (or any value or subrange therebetween), or from 2% to about 4% by weight of the cellulose ether. In an embodiment, the oxidizing agent is added so as to maintain the water content of the mixture between 1% to 10% by weight, or between 3% to 6% by weight of the cellulose ether. In a further embodiment, sodium borohydride may be used in place of the oxidizing agent (either anhydrous or in the same amount and form as the oxidizing agent).

The method includes adding an acid to the mixture. The acid is added to the reactor and contacts the cellulose ether to form the mixture. Nonlimiting examples of suitable acids include any hydrohalic acid (hydrogen chloride, hydrogen bromide, hydrogen iodide), sulfuric acid, nitric acid and phosphoric acid. Any combination of the foregoing acids may also be used. The amount of acid is from 0.05% to 1%, or from 0.1% to 0.5%, based on the total weight of the cellulose ether. In an embodiment, the acid has a pKa less than 5.

The acid partially decomposes or otherwise depolymerizes the cellulose ether. The acid may be added to the mixture in the reactor in any form such as a liquid, vapor, or gas. In an embodiment, the acid is added to the mixture in the form of an anhydrous gas. An anhydrous gas is advantageous for a number of reasons: 1) an anhydrous acid gas provides a high degree of dispersion and contact with the cellulose ether; 2) introduction of an anhydrous acid gas prevents localized concentrations of acid, thereby avoiding tar formations in the reactor; 3) an anhydrous acid gas avoids the addition of water to the mixture; and 4) with no additional water added, absorption of water by the cellulose ether product and water condensation problems in the reactor are avoided. The anhydrous acid gas can be added to the headspace of the reactor or directly into the cellulose ether powder. The headspace of the reactor may be purged with an inert gas to eliminate oxygen from the reaction chamber.

The mixture is heated to promote the depolymerization reaction. In an embodiment, the mixture is agitated (stirred, shaken, and/or tumbled) during the heating. The mixture is heated to a temperature from about 70° C. to about 100° C. for about 1 hour to 20 hours (or any value or subrange therebetween), or 8 hours to 16 hours, or greater than 10 hours to 20 hours, or about 16 hours.

As the cellulose ether depolymerizes, the cellulose ether exhibits discoloration. In other words, as the molecular weight of the cellulose ether decreases, the discoloration of the cellulose ether increases. Not wishing to be bound by any particular theory, it is believed that as depolymerization proceeds, more and more polymer end groups are formed. The increase in polymer end groups corresponds to an increase in the number of impurities capping the growing number of formant polymer end groups. These residual impurities lead to discoloration. Given the relatively higher number of end groups present in low viscosity cellulose ethers, low viscosity cellulose ethers tend to have more discoloration than high viscosity cellulose ethers. As one approaches the lower end of viscosity, the increase in cellulose ether discoloration is significant. For example, FIG. 1 illustrates the inverse relationship between color and viscosity for various METHOCEL (E3, E5, E6, E15, E50, and E4M) products.

It has been found that the discoloration of the cellulose ether can be minimized by 1) performing the depolymerization reaction in an oxygen-free environment and/or 2) limiting the water content of the mixture during depolymerization between 1% and 10% by weight. In an embodiment, the method is performed in an oxygen-free environment. An oxygen-free environment may be provided by applying an inert gas (such as nitrogen gas or a noble gas) blanket in the reactor chamber during the depolymerization reaction and/or during the entire production method.

Maintaining the water content of the mixture between 1% to 10% by weight (or any value or subrange therebetween) during the depolymerization reaction (alone or in combination with an inert gas blanket) reduces discoloration. It has been found that both (i) a mixture having too little water content and (ii) a mixture having too much water content each contribute to cellulose ether discoloration. Surprisingly, maintaining the water content of the mixture between 3% by weight to 6% by weight minimizes the amount of discoloration during the depolymerization reaction.

The method includes neutralizing the mixture. In an embodiment, a neutralizing agent is added to the reaction mixture. A "neutralizing agent" is a compound that can bring the low pH of the mixture (typically pH 1-5 after acid addition) to a pH from about 5.0 to about 8.0. The neutralizing agent neutralizes any remaining acid from the depolymerization reaction. The neutralizing agent may also extract acid present in the cellulose ether. Nonlimiting examples of suitable neutralizing agents include sodium dihydrogen phosphate, sodium hydrogen phosphate, sodium phosphate, sodium carbonate, sodium hydrogen carbonate, alkali salts of citric acid, alkali salts of succinic acids and combinations thereof. In an embodiment, the neutralizing agent is sodium bicarbonate.

Addition of the neutralizing agent ensures that the depolymerization reaction is terminated. In an embodiment, the neutralizing agent is an anhydrous basic powder. An anhydrous powder is advantageous because it does not introduce water or moisture into the mixture. For example, the neutralizing agent may be anhydrous sodium bicarbonate powder. In an embodiment, the neutralizing agent may have a moisture content so as to maintain the moisture content of the cellulose ether between 1% to 10% by weight, or between 3% to 6% by weight.

The neutralizing agent is added to the mixture by introducing it into the reactor as commonly known in the art. Nonlimiting examples of suitable addition methods for the neutralizing agent include liquid injection, spraying of aerosol or vapor, blowing of powder (i.e., by way of blowing dry powder with compressed or forced air or other mechanical pressure). The neutralizing agent neutralizes any acid present in the headspace and draws out some or most acid present in the cellulose ether. In an embodiment, the mixture is agitated as neutralization takes place.

Neutralization can take place at a wide range of temperatures depending upon the chemical properties of the acid and the neutralizing agent. The neutralizing agent may be added at the depolymerization reaction temperature. Alternatively, the mixture may be cooled to a temperature less than the depolymerization reaction temperature (or ambient temperature or less) prior to the addition of the neutralizing agent to the mixture.

The method includes adding a second oxidizing agent to the mixture. The first oxidizing agent and the second oxidizing agent may be the same or different. The second oxidizing agent may be any oxidizing agent as previously discussed herein. The second oxidizing agent is added in an amount from 0.01% to 6% by weight of the mixture (or any value or subrange therebetween), or from 2% to 4% by weight of the mixture. Upon addition of the second oxidizing agent, the mixture may be heated to a temperature from 60° C. to 110° C. (or any value or subrange therebetween), or 70° C. to 100° C., for 1 minute to 20 hours (or any value or subrange therebetween), or for 1 hour to 4 hours. This forms a very low viscosity (VLV) cellulose ether having a viscosity of about 1.2 cP to less than 2 cP. In an embodiment, the second oxidizing agent is added so as to maintain the water content of the mixture between 1% to 10% by weight, or between 3% to 6% by weight. It is understood that the method may include the addition of any number of additional oxidizing agents (i.e., three, four, five, or more oxidizing agents). Any subsequent oxidizing agent may be added in a manner similar to the addition of the second oxidizing agent.

In an embodiment, the method includes forming a cellulose ether having an American Public Health Association (APHA) color value from 1 to 100 (or any value or subrange therein) or from 1 to 50, or from 1 to 30, or from 1 to 20. The APHA value is determined in accordance with ASTM D-5386 (2% concentration in aqueous solution at ambient temperature). As used herein, a "very low color" (VLC) cellulose ether is a cellulose ether having an APHA value from 1 to 20 (or any value or subrange therebetween).

The present method advantageously produces a VLV cellulose ether with low color. As previously discussed, it has been problematic to produce VLV cellulose ether with acceptable color, particularly for appearance-sensitive applications, such as tablet coating. As shown in FIG. 1, as cellulose ether viscosity decreases below 10 cP, discoloration increases dramatically. Such discoloration makes cellulose ethers having a viscosity from about 3-5 cP or less unsuitable for appearance-sensitive applications. The present method, however, overcomes this problem and forms a VLV cellulose ether having surprisingly high color quality—namely, a cellulose ether with an APHA value from 1 to 100. In an embodiment, the APHA value for the VLV cellulose ether may be less 100. In a further embodiment, the present method forms a VLV cellulose ether with very low color, namely, an APHA value from 1 to 20.

In an embodiment, this method may produce a composition, such as a coating composition. The composition includes a cellulose ether. A 2% by weight aqueous solution of the cellulose ether has a viscosity from 1.2 cP to less than 2 cP at 20° C. (i.e., a VLV cellulose ether). In an embodiment, the 2% by weight solution of the cellulose ether has an APHA value from 1 to 100. In a further embodiment, this VLV cellulose ether may also be a VLC cellulose ether having an APHA value from 1-20. In yet a further embodiment, the cellulose ether is hydroxypropylmethylcellulose. The coating composition may be used to form immediate release coatings. A nonlimiting application for immediate release coatings is for coating orally administered tablets.

In an embodiment, the composition is a coating solution containing the VLV cellulose ether. The VLV cellulose ether is present in an amount of at least 10% by weight, or greater than 20% by weight, or from at least 10% to 40% by weight (or any value or subrange therebetween) of the coating solution.

The foregoing method may comprise two or more embodiments disclosed herein.

In an embodiment, another method for producing cellulose ether is provided. The method includes contacting a cellulose ether with a first oxidizing agent to form a mixture. The mixture is then heated. The method includes adding a second oxidizing agent to the mixture to form a very low color cellulose ether having an APHA value from 1 to 20. It is understood that the method may include the addition of any number of additional oxidizing agents (i.e., three, four, five, or more oxidizing agents). Any subsequent oxidizing agent may be added in a manner similar to the addition of the second oxidizing agent. The inventors have surprisingly found that this method utilizing a multiple-step addition of oxidizing agent results in a cellulose ether with surprisingly high color quality (i.e., low or no discoloration) without the necessity of acid addition. The present method produces a VLC cellulose ether. The VLC cellulose ether is produced without the use of an acid.

The first oxidizing agent and the second oxidizing agent may be the same or different and may be any oxidizing agent as previously disclosed herein. The form and amount of the first and the second oxidizing agents may be as previously disclosed herein. In an embodiment, the first oxidizing agent and the second oxidizing agent are added so as to maintain the water content of the cellulose ether from 1% to 10% by weight or between 3% to 6% by weight.

Heating of the mixture may be performed at a point in time (i) before addition of the second oxidizing agent (that is, after addition of the first oxidizing agent), (ii) after addition of the second oxidizing agent to the mixture, and (iii) any combination thereof. Heating may occur at any temperature and/or duration as previously discussed herein.

In an embodiment, the method can utilize an acid. In this embodiment, the method includes contacting the cellulose ether, with the first oxidizing agent and an acid. The acid (and the form and the amount of the acid) may be as previously disclosed herein. The method further includes forming a cellulose ether having a viscosity less than about 3 cP (when measured at 2% by weight aqueous solution at 20° C.). In a further embodiment, the method includes neutralizing the mixture after the heating. Consequently, the method includes forming a VLC cellulose ether having a viscosity less than 3 cP.

In an embodiment, this method may produce a composition, such as a coating composition. The composition includes a cellulose ether. A 2% by weight aqueous solution of the cellulose ether has a viscosity less than 3 cP at 20° C. and an APHA value from 1 to 100 (or any value or subrange therebetween). In an embodiment, a 2% by weight solution of the composition including the cellulose ether is a VLC cellulose ether solution having an APHA value of 1-20. In yet a further embodiment, the cellulose ether is hydroxypropylmethylcellulose.

In an embodiment, a method for coating a substrate is provided. The method includes applying an aqueous solution of a VLV cellulose ether on the substrate, and forming a coating on the substrate. The aqueous solution may be applied to coat or otherwise cover one or more surfaces of the substrate. Alternatively, the aqueous solution may be applied to coat the entire substrate.

As used herein, a "substrate" is an object capable of being partially or fully covered with cellulose ether. Nonlimiting examples of suitable substrates include tablets for oral ingestion, food products, pharmaceutical products (pharmaceutical tablets and capsules), medicaments, drugs, seeds, animal feed, granules, beads, powder, troches, and fertilizer. The substrate may also be an encapsulate such as a particulate material, the particulate material being encapsulated (micro- or macro-encapsulation) by the coating.

Application of the aqueous solution onto the substrate may include spraying and/or atomizing, the aqueous solution onto the substrate. Application may also include immersing (fully or partially) the substrate in the aqueous solution. In an embodiment, the aqueous solution is sprayed onto the substrate.

In an embodiment, the aqueous solution of the VLV cellulose ether has an APHA value of 1 to 100. In a further embodiment, the aqueous solution may be a VLC cellulose ether solution having an APHA value of 1 to 20 and have a viscosity less than 3 cP.

In an embodiment, the aqueous solution contains at least 10% by weight, or more than 20% by weight, or between 10% to 40% by weight (or any value or subrange therebetween) of the VLV cellulose ether. The method further includes spraying the aqueous solution containing at least 10% by weight VLV cellulose ether onto the substrate to coat the substrate. In a further embodiment, the method includes applying a single layer of the aqueous solution containing at least 10% cellulose ether and completely coating the substrate with cellulose ether.

In an embodiment, the aqueous solution having at least 10% VLV cellulose ether may have coloration similar to and/or identical to a conventional cellulose ether solution with a viscosity of 3 cP to 6 cP. For example, the coloration for the aqueous solution with greater than 10% by weight VLV cellulose ether at a given viscosity may be identical to or lower than the coloration of a Methocel E3, E5, and/or E6 solution (i.e., an APHA value from 40-60) at the same (or lower) viscosity. In other words, the at least 10% concentration VLV cellulose ether solution has the same or less discoloration as conventional cellulose ether coating solutions with lower cellulose ether concentration (i.e., conventional METHOCEL E3, E5, E6 coating solutions). Thus the present disclosure provides a VLV cellulose ether coating solution with (i) a higher cellulose ether concentration and (ii) the same (or better) color quality than conventional cellulose ether coating solutions.

The ability to spray an aqueous solution containing at least 10% weight cellulose ether is advantageous for several reasons. Conventional film coating techniques are time consuming because typical cellulose ether coating solutions (particularly immediate-release film coatings) cannot contain more than 10% by weight cellulose ether. This is because concentrations above 10% by weight cellulose ether prevent atomization of the coating solution. In addition, conventional cellulose ether concentration of greater than 10% have significant discoloration, making such solutions unsuitable for appearance-sensitive applications. The very low viscosity of the present cellulose ether overcomes this problem. High solution concentrations (i.e., aqueous solutions greater than 10% by weight cellulose ether) of the present VLV cellulose ether do not experience atomization problems when the solution is sprayed. The present VLV cellulose ether enables coating solutions with a high concentration of cellulose ether to be applied to a substrate using conventional applicators (i.e., atomizers and spray devices) with no clogging and/or no obstacles to atomization. Moreover, the present solution with at least 10% cellulose ether has acceptable low color making it suitable for appearance-sensitive applications.

A further advantage of the ability to spray an aqueous solution containing more than 10% weight cellulose ether is the production efficiencies it provides. Spraying a high concentration cellulose ether solution delivers more cellulose ether per unit spray than conventional cellulose ether solutions limited to 10% weight cellulose ether concentration. The ability to apply more cellulose ether (i) in a shorter period of time with (ii) less coating solution provides production efficiencies by reducing the time and materials required to coat the substrate.

The foregoing method and/or compositions may comprise two or more embodiments disclosed herein.

In an embodiment, a coated composition is provided. The coated composition includes a substrate and a coating on the substrate. The coating contains a VLV cellulose ether (viscosity from 1.2 cP to less than 2 cP). The VLV cellulose ether may have an APHA value of 1-100. The VLV cellulose ether in the coating may also be a VLC cellulose ether (1-20 APHA value). In an embodiment, the dry coating is 1%-20% by weight of the substrate and is transparent. In a further embodiment, this 1-20% by weight coating is clear, has no color (i.e., an APHA value≤1), or is otherwise color-free, and/or is haze-free.

The coating may be located on a portion of the substrate. In another embodiment, the coating surrounds the entire substrate and encapsulates the substrate. In an embodiment, the coating is uniform along all the surfaces (faces, sides, edges) of the substrate.

In an embodiment, the coating includes at least 10% by weight, or greater than 20% by weight, or between 10% to 30% by weight (or any value or subrange therebetween), of the very low viscosity cellulose ether. The coating is present in an amount from 1% to 20% by weight (or any value or subrange therebetween) of the substrate. In a further embodiment, the coating is a single layer.

The VLV/VLC cellulose ethers disclosed herein are useful in building products, food applications, excipients for pharmaceutical agents, cosmetics, and tablet coating for pharmaceuticals, medicaments, dietary supplements, candies, herbal products, over-the-counter pharmaceuticals, and drugs. The present VLVNLC cellulose ethers are also useful for taste masking and for flavor fixative applications.

The coated composition may comprise two or more embodiments disclosed herein.

By way of example and not limitation, examples of the present disclosure will now be given.

EXAMPLES

Example 1

Add METHOCEL F4M (29.5% wt MeO, 5.7% wt HPO) to an egg shaped flask, add anhydrous HCl by syringe and immerse the flask while rotating in a water bath at 86° C. for time indicated in Table 2 below. Parameters for this procedure are set forth in Table 2 below.

TABLE 2

| Sample No. | Methocel F4M, g. | 30% Peroxide Pretreat, g | HCl, g. | Rxn Time, hours | 2% Viscosity (cP) | APHA Color |
|---|---|---|---|---|---|---|
| 7 | 525 | 25 | 1.1 | 6 | 2.7 | 62 |
| 9 | 530 | 25 | 1.2 | 14 | 2.2 | 103 |

A nitrogen blanket is placed over the samples. Sodium bicarbonate is added after reaction to neutralize the acid.

Sample 7 is transferred to a Loedige reactor and 10 grams of 30% hydrogen peroxide is added by spraying while the Methocel is mixed. The reactor jacket is heated to 75° C. while mixing continued. After 3 hours, the product is removed from the reactor and tested. APHA color is found to be 31.4.

Sample 9 (492 g) is transferred to a Loedige reactor and 20 grams of 30% hydrogen peroxide is added to it by spraying while the product is mixed. After 5 minutes mixing, the reactor jacket is heated to 75° C. and held for 3 hours while mixing continues. Then another 10 grams of 30% hydrogen peroxide is added and mixing continues for 1 hour at 75° C. The Methocel is discharged and tested for viscosity and color. Viscosity is 2.17 cP (2% solution). APHA color is 21.2.

Example 2

A pilot plant batch is made in a pilot scale tumbling reactor under the following conditions.

Starting Methocel: F4M (29.4% wt MeO, 6.5% wt HPO)
Pounds: 10
Peroxide treatment: 91 grams of 30% hydrogen peroxide
HCl: 0.34% wt. based on Methocel
Time: 110 minutes
Temp: 95° C.
Sodium Bicarbonate Added: 40 grams
Product 2% Viscosity: 1.66 cp.
Product APHA Color: 488

This product is divided into four samples then tested by adding various amounts of 30% hydrogen peroxide to each sample in separate smaller Loediges. This is done by spraying the peroxide onto the product at room temperature and mixing for 10 minutes. The samples are then removed and a portion is transferred to an egg shaped flask. This is then rotated while immersed in a 75° C. water bath for 2 hours. APHA color is then measured on each sample. Results are shown in Table 3.

TABLE 3

| Sample No. | Grams 30% Hydrogen Peroxide/100 grams Methocel | 2% Viscosity cP | APHA Color |
|---|---|---|---|
| Starting Material | 0 | 1.66 | 488 |
| 1 | 6 | 1.66 | 143 |
| 2 | 8 | 1.66 | 91 |
| 3 | 10.5 | 1.66 | 23 |
| 4 | 12.9 | 1.66 | 15 |

Example 3

METHOCEL E4M (29.0% wt MeO, 8.5% wt HPO) is the starting material. The samples are noticeably yellow in color to the naked eye at the end of the LV reaction step. APHA color is not measured. All LV reactions use 250 grams of E4M and 0.6 gram hydrogen chloride and are carried out in a rotating round bottom flask immersed in a water bath. Nitrogen blanketing is used in all runs. Post treatment is performed for 3 hours at 75° C. in a rotating flask. The results are shown in Table 4 below.

TABLE 4

| Sample No. | 30% Peroxide Pretreat, g/250 g E4M | 30% peroxide post treat, g/250 g E4M | LV Reaction Temperature, ° C. | LV Reaction Time (hrs) | 2% Viscosity, cP | APHA Color after post treatment |
|---|---|---|---|---|---|---|
| 16 | 5 | 10 | 75 | 16 | 1.9 | 14 |
| 17 | 5 | 10 | 75 | 16 | 1.9 | 13 |
| 18 | 5 | 10 | 75 | 14 | 1.9 | 12 |
| 19 | 5 | 10 | 87 | 8 | 1.7 | 12 |
| 21 | 5 | 10 | 87 | 5.5 | 2.2 | 8 |
| 22 | 5 | 10 | 87 | 5.5 | 1.8 | 16 |
| 27 | 5 | 10 | 87 | 5 | 2.2 | 7 |

Example 4

METHOCEL E4M, 250 grams, are added to a round bottom flask and 0.6 grams anhydrous hydrogen chloride is added. The flask is attached to a rotovap and immersed in a heated bath at 88° C. for 5 hours while rotating and being purged with nitrogen. Sodium bicarbonate is then added to noticeably discolored powder and mixed. Then 10 grams of 30% hydrogen peroxide is added and the flask is put back on the rotovap and immersed in the bath for 2 more hours. The resulting product is tested and found to have a solution viscosity of 2.2 cp and APHA solution color of 7.3.

Example 5

TABLE 5

Preparation of Very Low Viscosity Methocel (based on 50 g Methocel E4M)

| Sample No. | Methocel Moisture % | 30% Peroxide Added | Anhydrous HCl Added | Reaction Temp. ° C. | Reaction Time (hr) | 2% Viscosity cP | APHA Color | Nitrogen blanketed |
|---|---|---|---|---|---|---|---|---|
| 53 | 4.1 | 0 | 0.1 g | 75 | 16 | 2.2 | 33 | Yes |

Sample No. 53 is produced under the conditions shown in Table 5. Sample No. 53 has an end viscosity of 2.2 cP and an APHA value of 33. Then, 250 g of Sample No. 53 is added to a reactor. Water is added to bring the moisture content up to 4.1%. 5 grams of 30% hydrogen peroxide is added before the reaction is started. Sixteen hours of reaction at 75° C., sodium bicarbonate is added to neutralize the acid and 10 grams of 30% hydrogen peroxide is added. The flask is returned to the rotovap and heated in the 75° C. water bath for 4 more hours. Two runs are made using this procedure, Sample No. 55 and Sample No. 57. Sample No. 55 and Sample No. 57 are combined to provide the sample for evaluation. The combined sample, Sample No. 58, had a 2% viscosity of 1.9 cP. and APHA color of 10.

For purposes of United States patent practice, the contents of any patent, patent application or publication referenced herein are hereby incorporated by reference in their entirety herein, especially with respect to the disclosure of structures, synthetic techniques and general knowledge in the art. It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A method for producing a cellulose ether comprising:
   contacting a cellulose ether with a first oxidizing agent and an acid to form a mixture;
   heating the mixture;
   neutralizing the mixture;
   after the step of neutralizing the mixture, adding at least a second oxidizing agent to the mixture; and
   forming a cellulose ether having a viscosity from 1.2 cP to 50 cP measured at 2% by weight aqueous solution at 20° C. and an APHA value from 1 to 100.

2. The method of claim 1 comprising heating the mixture at a temperature from 70° C. to 100° C. for 1 to 20 hours.

3. The method of claim 1 comprising heating the mixture after addition of the second oxidizing agent.

4. The method of claim 1 comprising maintaining the water content of the mixture between 3% and 6% by weight.

5. A method for coating a substrate comprising:
   applying an aqueous solution of a very low viscosity cellulose ether according to claim 1 on the substrate; and
   forming a coating comprising the very low viscosity cellulose ether on the substrate.

6. The method of claim 5 wherein the aqueous solution has an APHA value from 1 to 20.

7. The method of claim 5 wherein the aqueous solution comprises at least 10% by weight of the very low viscosity cellulose ether.

8. A method for producing a cellulose ether comprising:
   contacting a cellulose ether with a first oxidizing agent and an acid to form a mixture;
   heating the mixture;
   neutralizing the mixture, and then, adding at least a second oxidizing agent to the mixture; and
   forming a very low color cellulose ether having an APHA value from 1 to 20 and a viscosity less than about 3 cP measured at 2% by weight aqueous solution at 20° C.

9. The method of claim 8 comprising performing the heating at a point in time selected from the group consisting of before the adding, after the adding, and combinations thereof.

10. The method of claim 8 comprising neutralizing the mixture after the heating.

\* \* \* \* \*